United States Patent [19]

Tifre

[11] Patent Number: 4,996,738
[45] Date of Patent: Mar. 5, 1991

[54] FREE WHEEL CASTER

[76] Inventor: Salustiano Tifre, 496 New Jersey Ave., Brooklyn, N.Y. 11207

[21] Appl. No.: 472,968

[22] Filed: Jan. 31, 1990

[51] Int. Cl.$^5$ ............................................. B60B 33/08
[52] U.S. Cl. ................................. 16/26; 16/DIG. 27
[58] Field of Search ............................ 16/21, 23–26, 16/18 R, 30, 46, DIG. 27

[56] References Cited

U.S. PATENT DOCUMENTS

| | | | |
|---|---|---|---|
| 1,460,159 | 6/1923 | Karpiej | 16/26 |
| 3,401,421 | 9/1968 | Aninger | 16/25 |
| 4,123,819 | 11/1978 | Benedetti | 16/24 |
| 4,689,847 | 9/1987 | Huber | 16/24 |

FOREIGN PATENT DOCUMENTS 141901  8/1983  Japan ......................................... 16/24

Primary Examiner—Richard K. Seidel
Assistant Examiner—Edward A. Brown
Attorney, Agent, or Firm—Richard L. Miller

[57] ABSTRACT

A free wheel caster is provided and consists of a large ball rotatively carried within a cavity in a cup portion of a caster body which rolls against a plurality of small balls to ride freely within anti-friction material coating recesses in the cavity. The caster body can be attached to bottom of an object to move the object across a flat surface. It can also be attached to top of an object to move other objects thereacross. A ready access hole is also provided in the cup portion so that a tool can be inserted for prying and thereby removing the large ball from the cavity in the cup portion for cleaning and repair.

3 Claims, 1 Drawing Sheet

FREE WHEEL CASTER

BACKGROUND OF THE INVENTION

The instant invention relates generally to casters and more specifically it relates to a free wheel caster.

Numerous casters have been provided in the prior art that are adapted to utilize a large ball rotatively mounted within a housing which is attached under an object to make it easier to move. For example, U.S. Pat. Nos. 1,391,363 to Bozik; 1,460,159 to Karpiej and 4,203,177 to Kegg et al. all are illustrative of such prior art. While these units may be suitable for the particular purpose to which they address, they would not be as suitable for the purpose of the present invention as hereafter described.

SUMMARY OF THE INVENTION

A primary object of the present invention is to provide a free wheel caster that will overcome the shortcomings of the prior art devices.

Another object is to provide a free wheel caster that includes a large ball rotatively carried within a cavity in a caster body that rolls against a plurality of small balls in which the caster body can be attached to bottom of an object to moved, or in an alternative use attached to top of an object to move other objects thereacross.

An additional object is to provide a free wheel caster having a ready access hole for removing the large ball from the cavity in the caster body for cleaning and repair.

A further object is to provide a free wheel caster that is simple and easy to use.

A still further object is to provide a free wheel caster that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
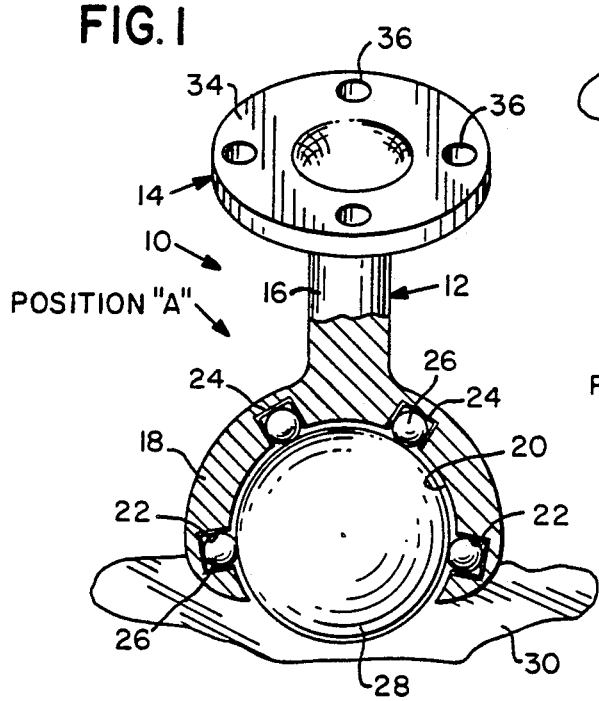
FIG. 1 is a diagrammatic perspective view of the instant invention showing the large ball in engagement with a surface.
Figure 2:
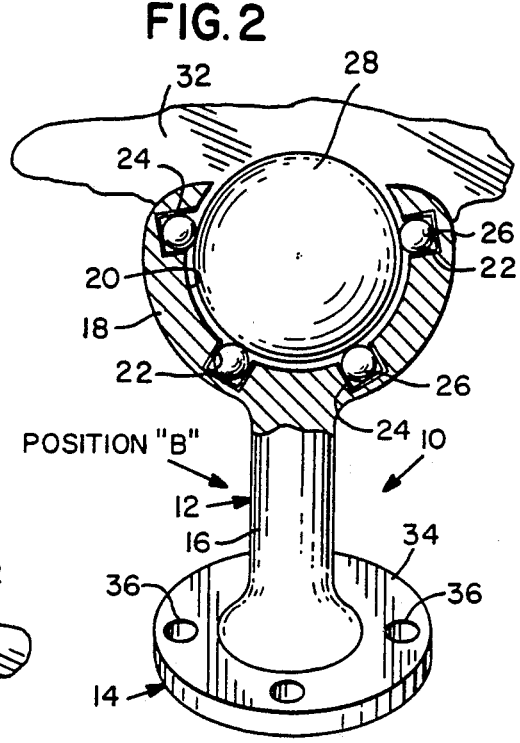
FIG. 2 is a similar view but with the device shown inverted.
Figure 3:
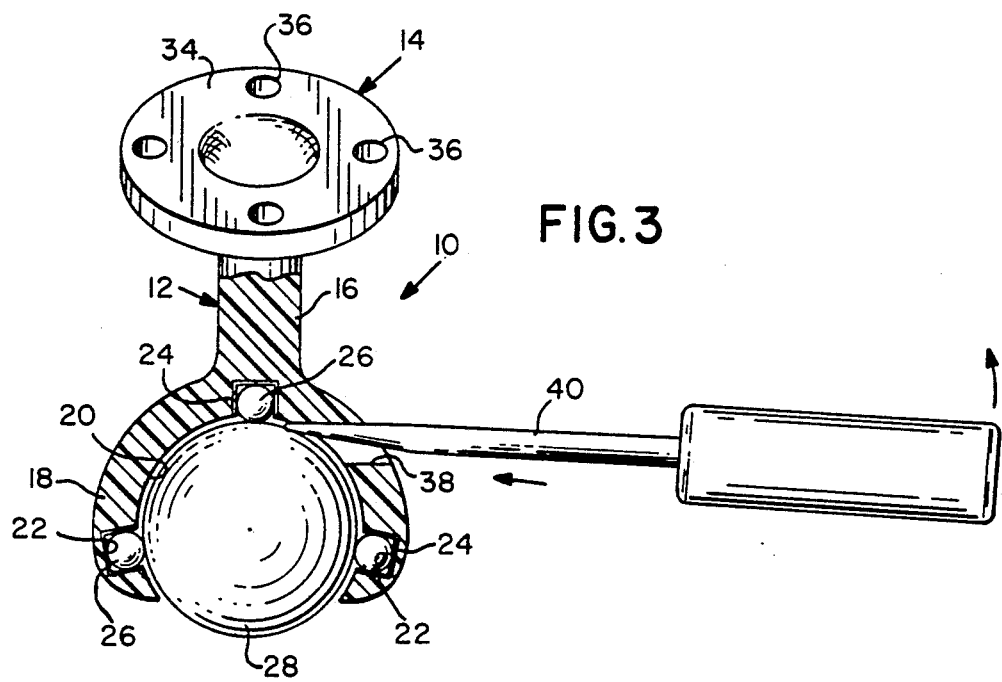
FIG. 3 is a diagrammatic perspective view of another embodiment of the instant invention illustrating a structure for removing the large ball for cleaning etcetera.

Turning now descriptively to the drawings, in which like reference characters denote like elements throughout the several views, FIGS. 1 through 3 illustrate a free wheel caster 10 consisting of a caster body 12 defined by a base portion 14, a shaft portion 16 extending from the base portion 14 and a cup portion 18 extending from the shaft portion 16. The base portion 14 is adapted to be affixed in a first position "A" as in FIG. 1, to the bottom of an object (not shown). The base portion 14 in a second position "B" as in FIG. 2, can also be affixed to top of an object (not shown). The cup portion 18 has a generally dome-shaped cavity 20 therein with a plurality of spaced apart recesses 22 thereabout.

An anti-friction material coating typically but not necessarily composed of TEFLON® 24 is applied within each of the recesses 22, so that a small ball 26 can freely ride within each recess 22. A large ball 28 is rotatively captivated in the cavity 20 to engage with the small balls 26 in a manner to be freely rotatable in any direction in the cavity 20. When the caster body 12 is affixed in the first position "A", the object can be moved easily along a flat surface 30 such as a floor or the like. When the caster body 12 is affixed in the second position "B", other objects 32 can be moved thereacross.

The base portion 14 defines a mounting plate 34 having a plurality of apertures 36 therethrough. The mounting plate 34 is typically transversely aligned with respect to the axis of the shaft portion 16 so that fasteners (not shown) such as screws can extend through the apertures 36 and into the object, for securement thereto.

As shown in FIG. 3, the cup portion 18 of the caster body 12 has a ready access hole 38 so that a tool 40, such as a screwdriver or the like, can be inserted through the ready access hole 38 to forcibly remove the large ball 28 from the dome-shaped cavity 28 so that the cup portion 18 can be cleaned and repaired.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A free wheel caster which comprises:
   (a) a caster body defined by a base portion, a shaft portion extending from the base portion and a one piece cup portion extending from the shaft portion, the base portion being adapted to be affixed in a first position to a bottom portion of an object and in a second position to a top portion of an object, the cup portion having a generally dome-shaped cavity therein with a plurality of spaced apart recesses formed in a wall of the cavity;
   (b) a plurality of small balls, each mounted to freely ride within a recess; and
   (c) a large ball rotatively captivated in the cavity to engage with said small balls in a manner to be freely rotatable in any direction in the cavity so that, when said base portion is affixed in the first position, the object can be moved easily along a flat surface, and when said base portion is affixed in the second position, other objects can be moved across said large ball;
   (d) the cup portion of said caster body having a ready access hole means extending through said wall of the cavity for inserting a tool therethrough and into the cavity to forcibly pry said large ball from the dome-shaped cavity so that the cup portion can be cleaned and repaired.

2. A free wheel caster as recited in claim 1, wherein the base portion of said caster body defines a mounting plate having a plurality of apertures therethrough, and said mounting plate is transversely aligned with respect to an axis of the shaft portion so that fasteners can extend through the apertures and into the object for securement thereto.

3. A free wheel caster as recited in claim 1, wherein an anti-friction coating is applied within each of the recesses.

* * * * *